United States Patent
Yamamoto et al.

(10) Patent No.: US 11,345,465 B2
(45) Date of Patent: May 31, 2022

(54) SYSTEM FOR DETERMINING THE STACK CLOSURE PRESSURE OF A BRAKE STACK

(71) Applicant: The Boeing Company, Chicago, IL (US)

(72) Inventors: David T. Yamamoto, Mill Creek, WA (US); Steven Elliot Smith, Lynnwood, WA (US); Nima Forghani, Seattle, WA (US)

(73) Assignee: The Boeing Company, Chicago, IL (US)

(*) Notice: Subject to any disclaimer, the term of this patent is extended or adjusted under 35 U.S.C. 154(b) by 314 days.

(21) Appl. No.: 16/410,730

(22) Filed: May 13, 2019

(65) Prior Publication Data

US 2020/0361598 A1 Nov. 19, 2020

(51) Int. Cl.
| | |
|---|---|
| *B64C 25/42* | (2006.01) |
| *B64C 25/46* | (2006.01) |
| *B60T 17/22* | (2006.01) |
| *B60T 13/66* | (2006.01) |
| *B60T 13/68* | (2006.01) |
| *F16D 66/00* | (2006.01) |

(52) U.S. Cl.
CPC .......... *B64C 25/426* (2013.01); *B60T 13/662* (2013.01); *B60T 13/686* (2013.01); *B60T 17/22* (2013.01); *B64C 25/46* (2013.01); *F16D 2066/005* (2013.01)

(58) Field of Classification Search
CPC ..... B64C 25/426; B64C 25/46; B60T 13/686; B60T 17/22; B60T 13/662; F16D 2066/005
See application file for complete search history.

(56) References Cited

U.S. PATENT DOCUMENTS

| | | | |
|---|---|---|---|
| 5,058,699 A | 10/1991 | Fennel et al. | |
| 5,505,531 A | 4/1996 | Griffith et al. | |
| 2009/0204302 A1 | 8/2009 | Kondo et al. | |
| 2010/0274457 A1* | 10/2010 | Cahill | B60T 13/741 701/70 |
| 2010/0276989 A1* | 11/2010 | Metzger, Jr. | B60T 15/14 303/20 |
| 2015/0239438 A1 | 8/2015 | Bohm | |
| 2018/0297565 A1 | 10/2018 | Georgin | |
| 2020/0055445 A1* | 2/2020 | Park | B60T 13/74 |

OTHER PUBLICATIONS

EP, Extended European Search Report, EP Patent Application No. 20172646.0-1012 (Nov. 2, 2020).

* cited by examiner

*Primary Examiner* — James M McPherson
*Assistant Examiner* — Kyle J Kingsland
(74) *Attorney, Agent, or Firm* — Vivacqua Crane, PLLC

(57) ABSTRACT

A brake system includes a brake stack having a stack closure pressure, a force member positioned within a cylinder, a valve configured to control fluid pressure of the brake system, and one or more pressure transducers that generate a proportional electrical signal representative of the fluid pressure within the cylinder. The brake system also includes one or more processors in electronic communication with the valve, the one or more pressure transducers, and a memory coupled to the one or more processors. The memory stores data comprising a database and program code that, when executed by the one or more processors, causes the brake system to determine the stack closure pressure of the brake stack.

20 Claims, 8 Drawing Sheets

SYSTEM FOR DETERMINING THE STACK CLOSURE PRESSURE OF A BRAKE STACK

INTRODUCTION

The present disclosure relates to brake systems. More specifically, the present disclosure relates to a brake system that determines a stack closure pressure of a brake stack based on monitoring a fluid pressure of the brake system.

BACKGROUND

Aircraft brakes are used in a variety of situations. For example, aircraft brakes are used to slow the aircraft down during landing roll along a runway. Aircraft brakes may also be used during ground handling operations such as, for example, taxiing, steering, and parking. Aircraft brakes typically include a brake stack having a series of rotating members, which are referred to as rotors, that turn along with the wheels of the aircraft. The brake stack also includes a series of stationary members, which are referred to as stators, that are interleaved with the rotors.

When the brake stack is compressed, friction forces are developed between the rotors and stators and a brake torque is generated. The brake torque causes the aircraft to decelerate and eventually come to a stop. It is to be appreciated that brake torque is only generated after the rotors and stators are compressed to the point they are in firm contact with one another, which is referred to as brake stack closure. Hydraulically actuated aircraft brakes require a minimum amount of hydraulic brake pressure to overcome the spring force exerted to maintain the running clearance between the brake piston and the stators to generate brake torque. The minimum amount of hydraulic brake pressure required to generate brake torque is referred to as stack closure pressure.

Sometimes the aircraft brakes may either be underfilled or overfilled with hydraulic brake fluid. Thus, a rapid onset of brake torque results in aircraft deceleration overshoot. In contrast, underfilling results in an initial brake pressure that is too low. This results in brake onset delay that is often accompanied by pressure overshoot at the moment brake stack closure occurs.

SUMMARY

According to several aspects, a brake system having a brake stack with a stack closure pressure is disclosed. The brake system includes a force member positioned within a cylinder, a valve configured to adjust fluid pressure in the brake system, and one or more pressure transducers that generate a proportional electrical signal representative of the fluid pressure within the cylinder. The brake system also includes one or more processors in electronic communication with the valve and the one or more pressure transducers, and a memory coupled to the one or more processors. The memory stores data comprising a database and program code that, when executed by the one or more processors, causes the brake system to generate a valve command instructing the valve to modulate the fluid pressure in the brake system based on a waveform of a periodic signal, which results in modulating an amount of brake fluid supplied to the cylinder. The brake system is also caused to monitor an output of the proportional electrical signal generated by the one or more pressure transducers, where the output of the proportional electrical signal is not equal to a fluid pressure indicated by the valve command until the stack closure pressure is achieved. The brake system is also caused to determine the fluid pressure within the cylinder is at the stack closure pressure when the output of the proportional electrical signal is about equal to the fluid pressure indicated by the valve command.

In another embodiment, a brake system having a brake stack with a stack closure pressure is disclosed, and includes a force member positioned within a cylinder, a valve configured to adjust fluid pressure in the brake system, and one or more pressure transducers that generate a proportional electrical signal representative of the fluid pressure within the cylinder is disclosed. The brake system also includes one or more processors in electronic communication with the valve and the one or more pressure transducers and a memory coupled to the one or more processors. The memory stores data comprising a database and program code that, when executed by the one or more processors, causes the brake system to generate a valve command instructing the valve to modulate the fluid pressure in the brake system based on a waveform of a periodic signal, which results in modulating an amount of brake fluid supplied to the cylinder. The brake system is also caused to monitor an output of the proportional electrical signal generated by the one or more pressure transducers, where the output of the proportional electrical signal is in phase with the fluid pressure indicated by the valve command until the stack closure pressure is achieved. The brake system is further caused to detect a phase lag between the output of the proportional electrical signal generated by the one or more pressure transducers and the fluid pressure indicated by the valve command. In response to detecting the phase lag, the brake system determines a value the output of the proportional electrical signal generated by the one or more pressure transducers immediately after the phase lag is detected is the stack closure pressure.

In still another embodiment, method for determining a stack closure pressure for a brake stack of a brake system is disclosed. The method includes generating, by a computer, a valve command instructing a valve to modulate fluid pressure in the brake system based on a waveform of a periodic signal, which results in modulating an amount of brake fluid supplied to a cylinder. The method also includes monitoring, by the computer, an output of a proportional electrical signal generated by one or more pressure transducers. The one or more pressure transducers monitor the fluid pressure of the cylinder and the output of the proportional electrical signal is not equal to the fluid pressure indicated by the valve command until the stack closure pressure is achieved. Finally, the method includes determining the fluid pressure within the cylinder is at the stack closure pressure when the output of the proportional electrical signal is about equal to the fluid pressure indicated by the valve command.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a system and method for determining a stack closure pressure of a brake stack. The brake stack is part of a brake system for a vehicle. The stack closure pressure represents a minimum amount of brake pressure required to generate brake torque, where the brake torque causes the vehicle to either decelerate or come to a stop. The stack closure pressure is then used as an initial commanded pressure by the brake system. It is to be appreciated that the initial commanded pressure may be used in an autobrake control system. Setting the stack closure pressure as the initial commanded pressure of the brake system reduces the lag that commonly occurs in conventional open loop brake systems when the brakes are initially applied. The stack closure pressure is recalculated over time to account for changes in the brake system such as, for example, brake wear and any changes in the volume of the brake fluid.

The following description is merely exemplary in nature and is not intended to limit the present disclosure, application, or uses.

Figure 1:
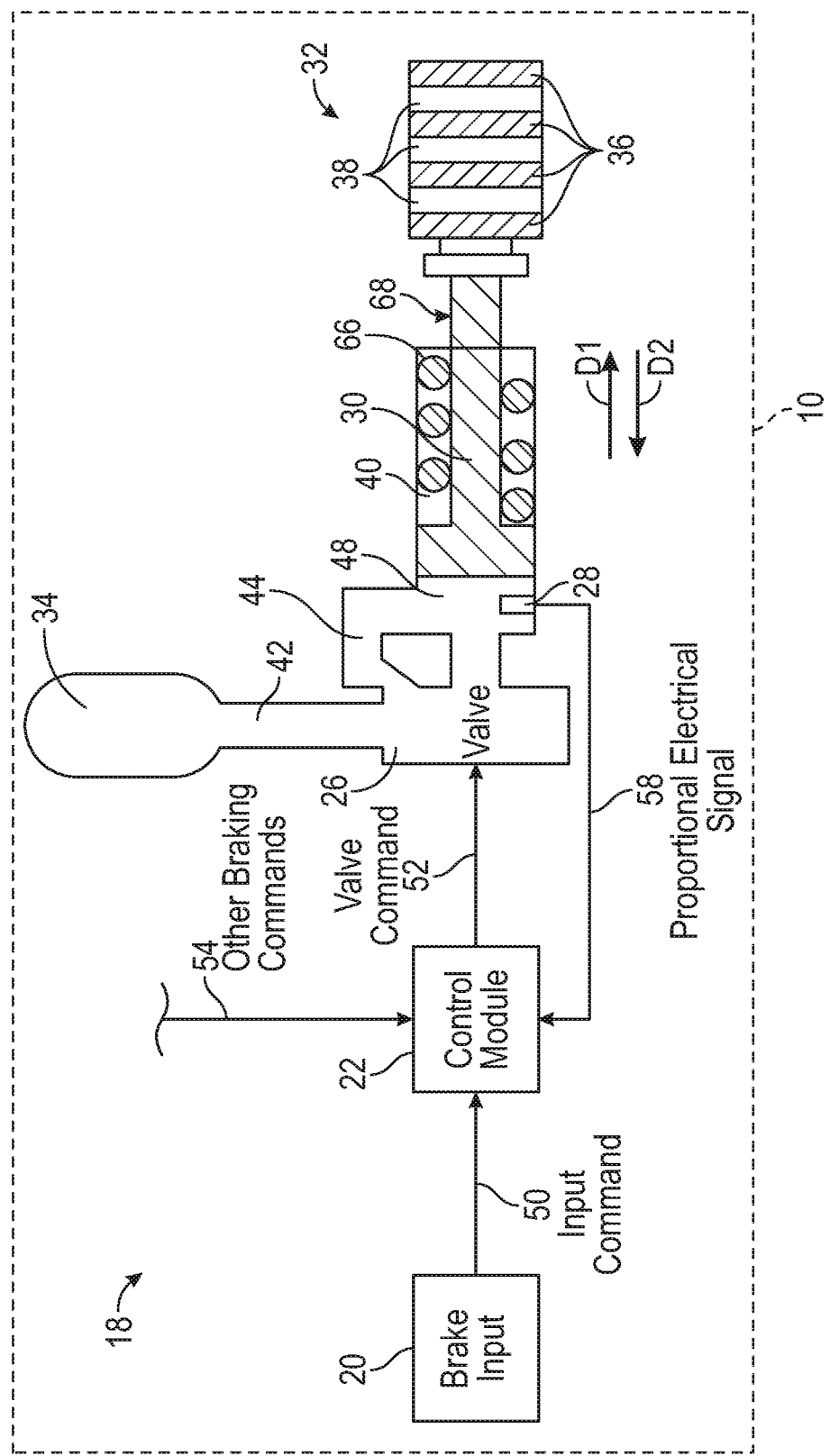
FIG. 1 is a schematic diagram of a vehicle including the disclosed brake system, where the brake system has a control module, a valve, a force member disposed within a cylinder, a brake stack, and a fluid reservoir according to an exemplary embodiment.
Figure 2:
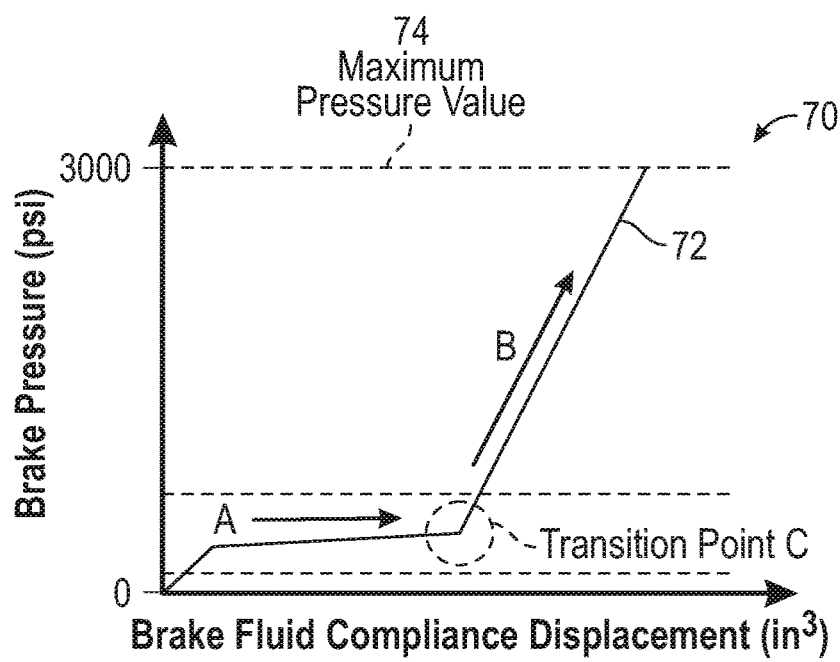
FIG. 2 is a graph illustrating a procedure for determining a stack closure pressure of the brake stack illustrated in FIG. 1 according to an exemplary embodiment.

Referring to FIG. 1, a schematic diagram of a vehicle 10 having a brake system 18 is illustrated. The brake system 18 includes a brake input 20, a control module 22, a valve 26, one or more pressure transducers 28, a force member 30, a brake heat stack, which is referred to as a brake stack 32, and a fluid reservoir 34. The control module 22 is in electronic communication with the brake input 20, the valve 26, and the pressure transducers 28. The force member 30 is configured to translate back and forth in a linear motion within a cylinder 40. Specifically, the force member 30 translates within the cylinder 40 in response to a change in fluid pressure within a pressurized chamber 48 of the cylinder 40, which is explained in greater detail below and is shown in FIGS. 2-4. The brake system 18 also includes a high pressure conduit 42 that fluidly connects the fluid reservoir 34 to the valve 26 and a return conduit 44 that fluidly connects the pressurized chamber 48 of the cylinder 40 to the valve 26. The pressure transducers 28 monitor the fluid pressure within the cylinder 40, and more specifically the fluid pressure of the pressurized chamber 48 within the cylinder 40.

The brake stack 32 includes one or more rotors 36 interleaved with one or more stators 38. A brake stack closure represents a state of the brake stack 32 where the rotors 36 and stators 38 bear frictionally upon one another, and any further compression of the brake stack 32 creates a brake torque that resists movement of the vehicle 10. As explained below, the control module 22 determines a stack closure pressure of the brake stack 32. The stack closure pressure represents a minimum amount brake pressure required to generate the brake torque by the brake stack 32.

In one embodiment, the vehicle 10 is an aircraft and the brake system 18 employs hydraulic braking fluid for transferring hydraulic pressure to the brake stack 32. However, it is to be appreciated that the vehicle 10 is not limited to an aircraft. It is also to be appreciated that while FIG. 1 illustrates only a single brake system 18, an aircraft may actually include multiple brake systems 18. For example, an aircraft may include separate brake systems that correspond to the left and right wheels of an aircraft. Thus, individual stack closure pressures are determined for each individual brake system 18.

The disclosed brake system 18 is any brake system including a dead band space. The dead band space represents the displacement a brake piston (i.e., the force member 30) undergoes as a user initially exerts force upon the brake pedal, but the force is not transmitted to the brake stack 32. Therefore, the brake system 18 is not limited to hydraulic systems. For example, in an alternative embodiment, the brake system 18 may be a pneumatically based brake system instead of a hydraulic brake system. Accordingly, the brake fluid is a liquid or a gas.

Figure 8:
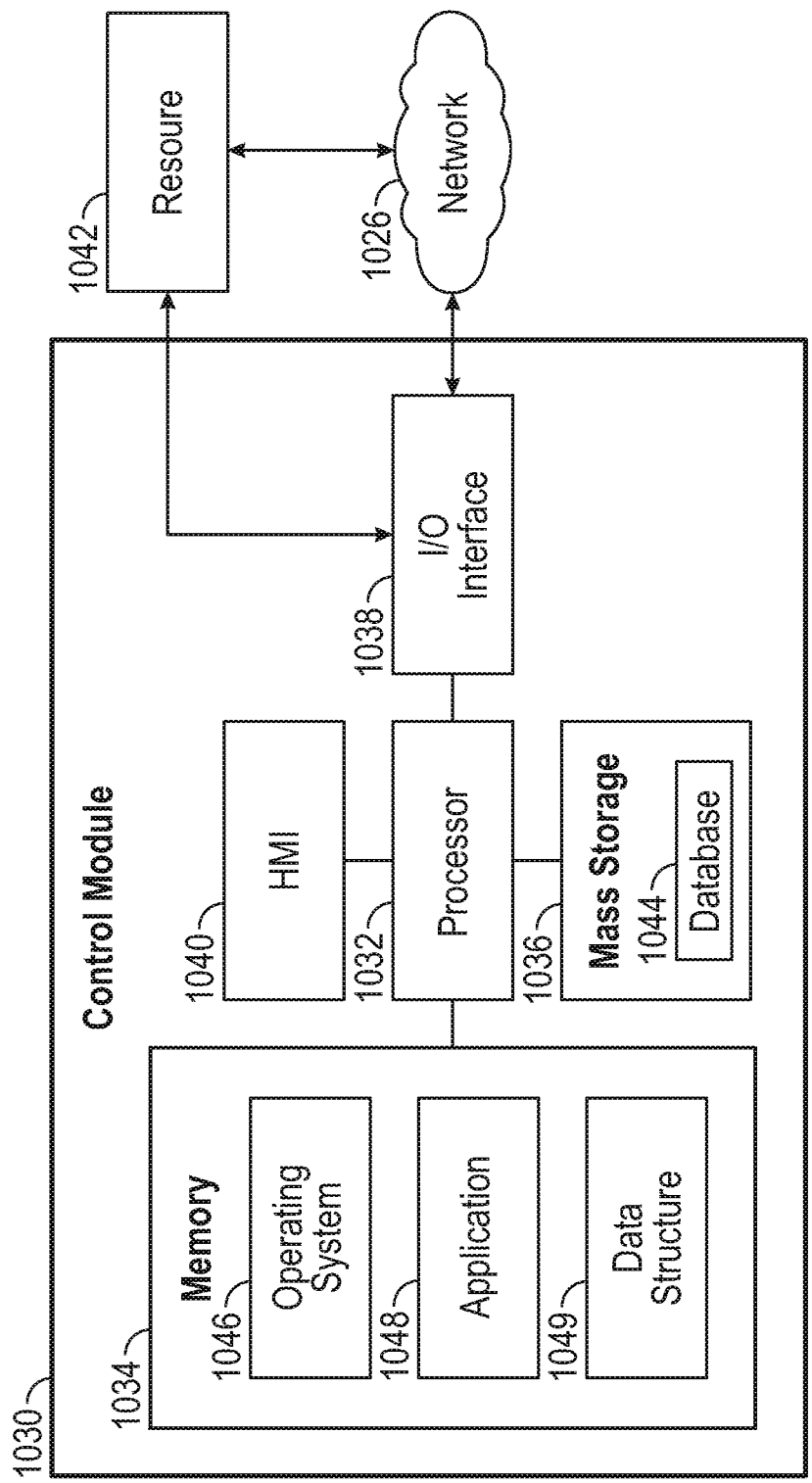
FIG. 8 is an illustration of a computer system used by the brake system of FIG. 1 according to an exemplary embodiment.

In one embodiment, the brake input 20 is a brake pedal. An operator depresses the brake pedal manually to create an input command 50 received by the control module 22. The input command 50 represents an amount of braking requested by the brake system 18. Thus, if a manual brake pedal is employed, then an operator indicates the amount of braking requested by the brake system 18 using the brake pedal. Alternatively, instead of manual control, the input command 50 is generated by an autobrake algorithm, where autobrake instructions are saved in a memory 1034 of the control module 22 (the memory 1034 is shown in FIG. 8).

In response to receiving the input command 50 from the brake input 20, the control module 22 determines a valve command 52. Specifically, the control module 22 determines the valve command 52 based on the input command 50 from the brake input 20. The valve command 52 may also be determined based on a plurality of other braking commands 54. Some examples of the other braking commands 54 include, but are not limited to, autobrake, gear retract braking, or parking brake. For example, if the autobrake algorithm is employed, then the autobrake instructions generate the input command 50, where the input command 50 represents the amount of braking requested by the brake system 18. The control module 22 then determines the valve command 52 based on at least the input command 50. The valve command 52 is sent to the valve 26, where the valve 26 is configured to adjust the fluid pressure in the brake system 18. In response to receiving the valve command 52 from the control module 22, the valve 26 adjusts an amount of fluid pressure supplied to the brake system 18, which results in an increase in an amount of the brake fluid contained within the pressurized chamber 48. Specifically, the valve 26 either increases or decreases the amount of pressure supplied to the brake system 18.

The force member 30 may be a piston that includes an end portion 68. A biasing member 66, such as a coil spring, may be placed within the cylinder 40. The force member 30 overcomes a biasing force exerted by the biasing member 66 to translate in a first direction D1 towards the brake stack 32. As the force member 30 translates in the first direction D1 the end portion 68 of the force member 30 eventually abuts against and exerts a compressive force upon the brake stack 32. For example, referring to FIGS. 1 and 2, actuating the valve 26 results in an increase in the amount of brake fluid supplied to the cylinder 40 until the fluid pressure of the pressurized chamber 48 is at least equal to the stack closure pressure (the stack closure pressure is labeled in FIG. 2 as transition point C). Once the fluid pressure of the pressurized chamber 48 is at least equal to the stack closure pressure, any additional brake fluid supplied to the pressurized chamber 48 results in the end portion 68 of the force member 30 further compressing the brake stack 32. The force member 30 continues to compress the brake stack 32 until the fluid pressure of the pressurized chamber 48 reaches a maximum pressure value 74 (FIG. 2). Thus, when the fluid pressure of the pressurized chamber 48 is at the maximum pressure value 74, the brake stack 32 (FIG. 1) is fully compressed.

The pressure transducers 28 generate a proportional electrical signal 58 representative of the fluid pressure in the pressurized chamber 48 of the cylinder 40. The proportional electrical signal 58 is received by the control module 22. For example, in one non-limiting embodiment the proportional electrical signal 58 is a current value ranging from about four to about twenty milliamps. Although current is described, it is to be appreciated that the pressure transducers 28 may output other electrical signals instead. That is, the proportional electrical signal 58 is selected from a current value, a capacitance value, or a voltage value. For example, in one non-limiting embodiment, the valve 26 is a servo valve and the valve command 52 is a milliamp signal.

An approach to determine the stack closure pressure of the brake stack 32 is now described. FIG. 2 is a graph 70 illustrating an exemplary procedure to determine the stack closure pressure, where the x-axis represents a brake fluid compliance displacement within the pressurized chamber 48 of the cylinder 40 and the y-axis represents the fluid pressure as measured by the pressure transducers 28. Referring to both FIGS. 1 and 2, the brake fluid compliance displacement represents the displacement of the force member 30 within the cylinder 40, where positive displacement is movement in the first direction D1 and negative displacement is movement in a second direction D2. As seen in FIG. 2, the second direction D2 is opposite the first direction D1 and is oriented in a direction away from the brake stack 32.

The control module 22 generates a valve command 52 instructing the valve 26 to increase the fluid pressure of the brake system 18 and results in an increase in the amount of brake fluid supplied to the cylinder 40 at a fixed rate. The fixed rate represents a steady-state amount of brake fluid supplied to the cylinder 40. The graph 70 includes a line representing an output 72 of the proportional electrical signal 58 generated by the one or more pressure transducers 28. The output 72 is divided into two portions, namely portion A and portion B. During portion A, the control module 22 instructs the valve 26 to increase the fluid pressure, which results in an increase in the amount of brake fluid supplied to the cylinder 40 at the fixed rate. However, as seen in FIG. 2, although the brake fluid compliance displacement along the y-axis increases, there is only a negligible increase in the brake pressure. That is, the relationship between the hydraulic brake fluid compliance displacement and the fluid pressure has a derivative value (i.e., the slope of a line) of about zero. For purposes of the disclosure, about zero may include positive fluid pressure values. For example, in an embodiment any fluid pressure values that are less than about 300 psi (2068 kilopascals) may be considered about zero. In one embodiment, the control module 22 filters derivative values of the output 72 of the proportional electrical signal 58 that are below a threshold pressure value to about zero. The threshold pressure value represents negligible changes in the brake pressure that may be disregarded for purposes of detecting the stack closure pressure. That is, in response to determining the derivative value of the output 72 of the proportional electrical signal 58 is below the threshold pressure value, the control module 22 sets the derivative value to about zero. For example, in one embodiment the threshold pressure value is about 200 pounds per square inch (psi) (about 1379 kilopascals).

Portion A terminates at the transition point C. The transition point C represents when the derivative value of the fluid pressure exceeds about zero and increases to a positive value. In an embodiment, the positive value is equal to or greater than about 300 psi. The transition point C represents the stack closure pressure of the brake system 18. As mentioned above, the stack closure pressure represents the minimum amount brake pressure required to generate brake torque by the brake stack 32.

It is to be appreciated that while portions A and B of the output 72 of the proportional electrical signal 58 generated by the one or more pressure transducers 28 include different derivative values, the rate at which brake fluid is supplied to the cylinder 40 does not change. In other words, the brake fluid continues to be supplied to the cylinder 40 at the fixed rate.

In one embodiment, the control module 22 selects the fluid pressure at the transition point C as the stack closure pressure of the brake system 18, where the stack closure pressure represents the minimum amount brake pressure required to generate brake torque by the brake stack 32. The fluid pressure at the transition point is saved in the memory 1034 (FIG. 8) of the control module 22, where the memory 1034 stores the magnitude of previously recorded derivative values of the fluid pressure, which are referred to as a plurality of previously recorded values at the transition point C. Thus, the stack closure pressure of the brake system 18 is an average of the fluid pressure at the transition point and the plurality of previously recorded values at the transition point C. For example, in one embodiment, the magnitude of at least three fluid pressures are stored in the memory of the control module 22 before the stack closure pressure is determined by the control module 22. It is to be appreciated that the stack closure pressure may be adjusted over time to take factors such as, for example, wear in the brake stack 32 and a change in the volume of the brake fluid into account.

Figure 3A:
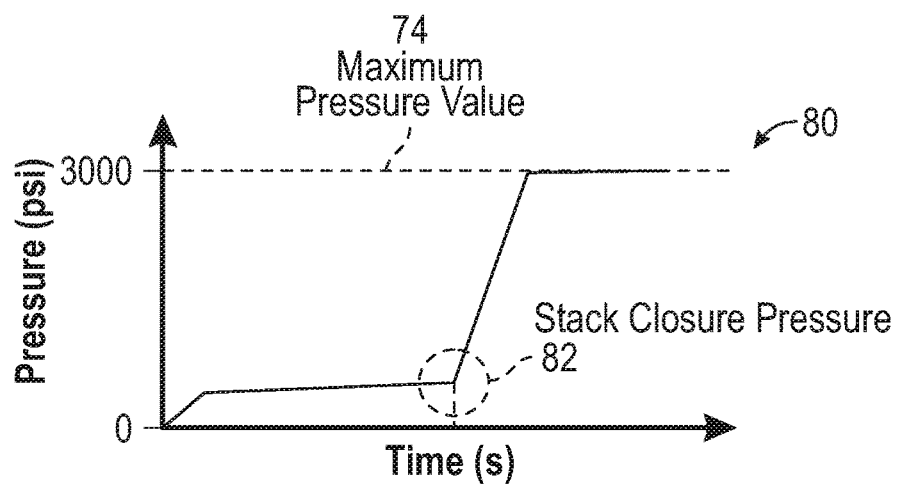
FIG. 3A is a graph illustrating the fluid pressure of the brake fluid when the procedure shown in FIG. 2 is performed according to an exemplary embodiment.
Figure 3B:
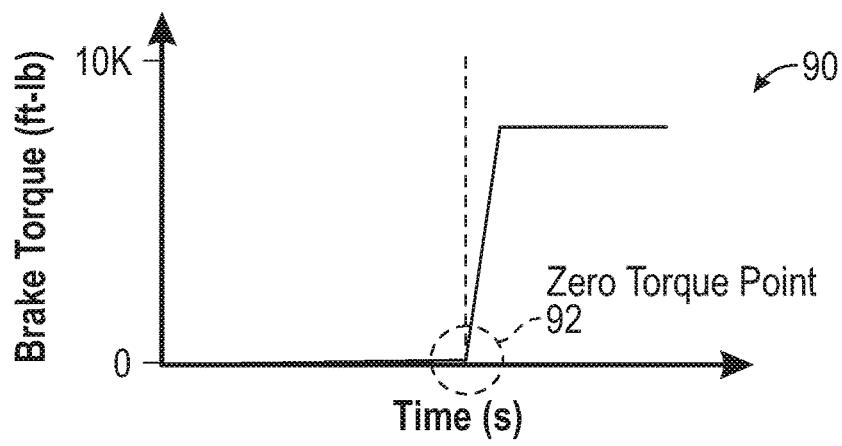
FIG. 3B is a graph illustrating the brake torque generated by the brake stack when the procedure shown in FIG. 2 is performed according to an exemplary embodiment.
Figure 4:
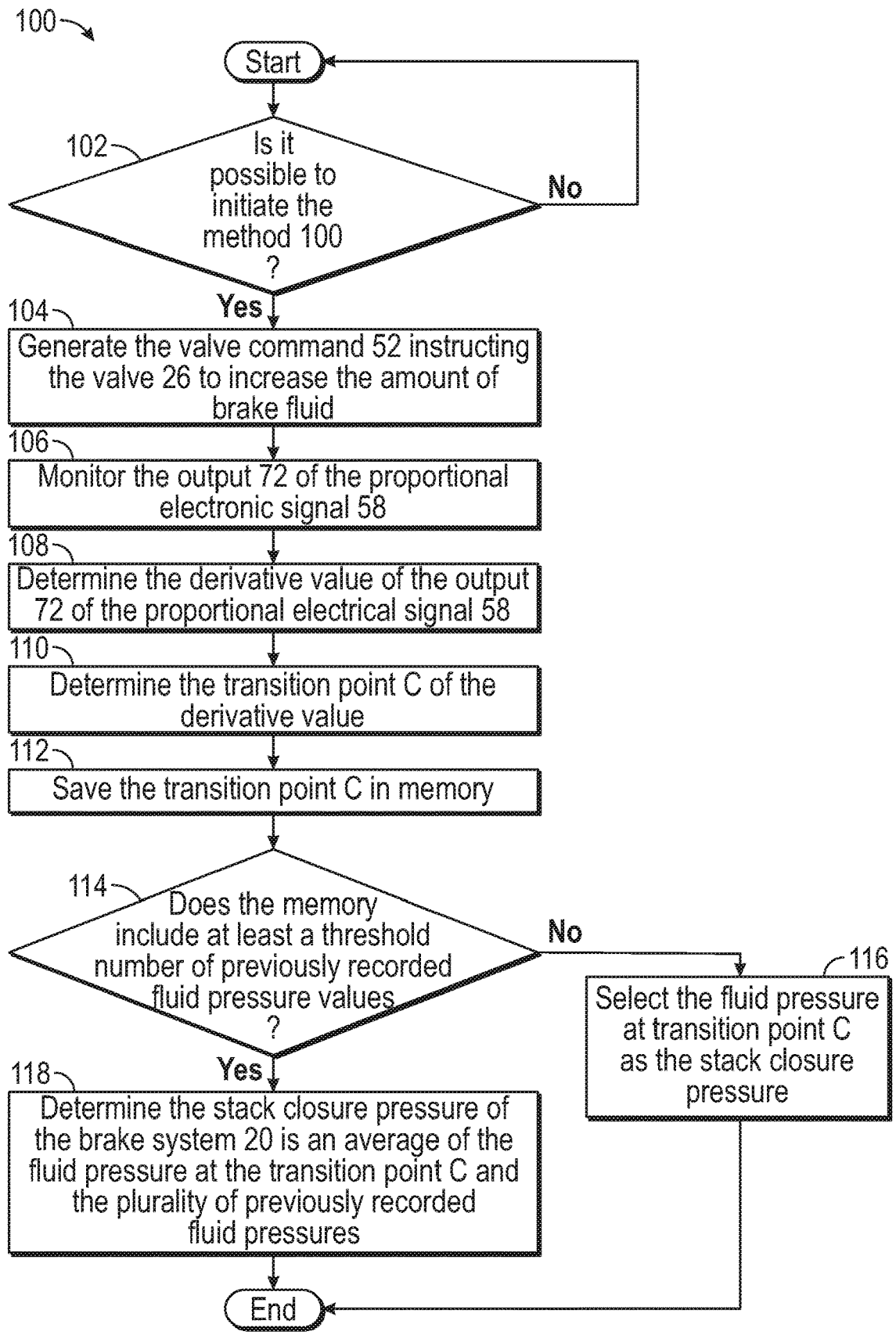
FIG. 4 is a process flow diagram illustrating a method for determining the brake stack closure according to an exemplary embodiment.

FIG. 3A shows a graph 80 illustrating a relationship between fluid pressure of the pressurized chamber 48 and time during the procedure shown in FIG. 2. FIG. 3A also illustrates stack closure pressure 82 and the maximum pressure value 74. The stack closure pressure 82 represents the minimum amount of brake pressure required to generate brake torque, and the maximum pressure value 74 represents the maximum amount of brake pressure the brake system 18 may command. That is, at the maximum pressure value 74, the brake stack 32 (FIG. 1) is fully compressed. FIG. 3B shows a graph 90 illustrating a relationship between brake torque and time during the procedure shown in FIG. 2. FIG. 3B also illustrates a zero torque point 92. The zero torque point 92 represents when the brake stack 32 (FIG. 1) starts to create brake torque to cause the vehicle 10 to decelerate or stop.

FIG. 4 is an exemplary process flow diagram illustrating a method 100 for determining the stack closure pressure of the brake system 18. Referring to both FIGS. 1 and 4, the method 100 begins at block 102. In block 102, the control module 22 determines if the method 100 is initiated. For example, if the vehicle 10 is an aircraft, then the method 100 is initiated if the aircraft is in the air and the landing gear (not shown) of the aircraft is deployed. Once the method 100 is initiated, then the method 100 proceeds to block 104.

In block 104, the control module 22 generates the valve command 52 instructing the valve 26 to increase the fluid pressure of the brake system 18 and results in an increase in the amount of brake fluid supplied to the cylinder 40 the amount of brake fluid supplied to the cylinder 40 at the fixed rate. The method 100 may then proceed to block 106.

In block 106, the control module 22 monitors the output 72 (FIG. 2) of the proportional electrical signal 58 generated by the one or more pressure transducers 28. The method 100 may then proceed to block 108.

In block 108, the control module 22 determines the derivative value of the output 72 (FIG. 2) of the proportional electrical signal 58 generated by the one or more pressure transducers 28. It is to be appreciated that the proportional electrical signal 58 is monitored by the control module 22 as the valve 26 increases the amount of brake fluid supplied to the cylinder 40 at the fixed rate. The method 100 may then proceed to block 110.

In block 110, the control module 22 determines the transition point C of the derivative value, where the transition point C occurs when the derivative value exceeds about zero and increases to a positive value. The method 100 may then proceed to block 112.

In block 112, the control module 22 saves the transition point C determined in block 110 in the memory 1034 (FIG. 8). The method may then proceed to decision block 114.

In decision block 114, the control module 22 determines if the memory 1034 includes at least the threshold number of previously recorded fluid pressures at the transition point. For example, in one embodiment threshold number of previously recorded fluid pressures is two. Therefore, there are three total fluid pressures saved in the memory 1034. If the memory 1034 does not include the threshold number of previously recorded values, then the method 100 proceeds to block 116. In block 116, the control module 22 selects the fluid pressure at the transition point C determined in block 110 as the brake stack pressure. Alternatively, the control module 22 may not select a brake stack pressure. The method 100 may then terminate.

If the memory 1034 includes the threshold number of previously recorded values, then the method 100 may proceed to block 118. In block 118, the control module 22 determines the stack closure pressure of the brake system 18 is an average of the fluid pressure at the transition point C and the plurality of previously recorded values at the transition point C. The method 100 may then terminate.

Figure 5A:
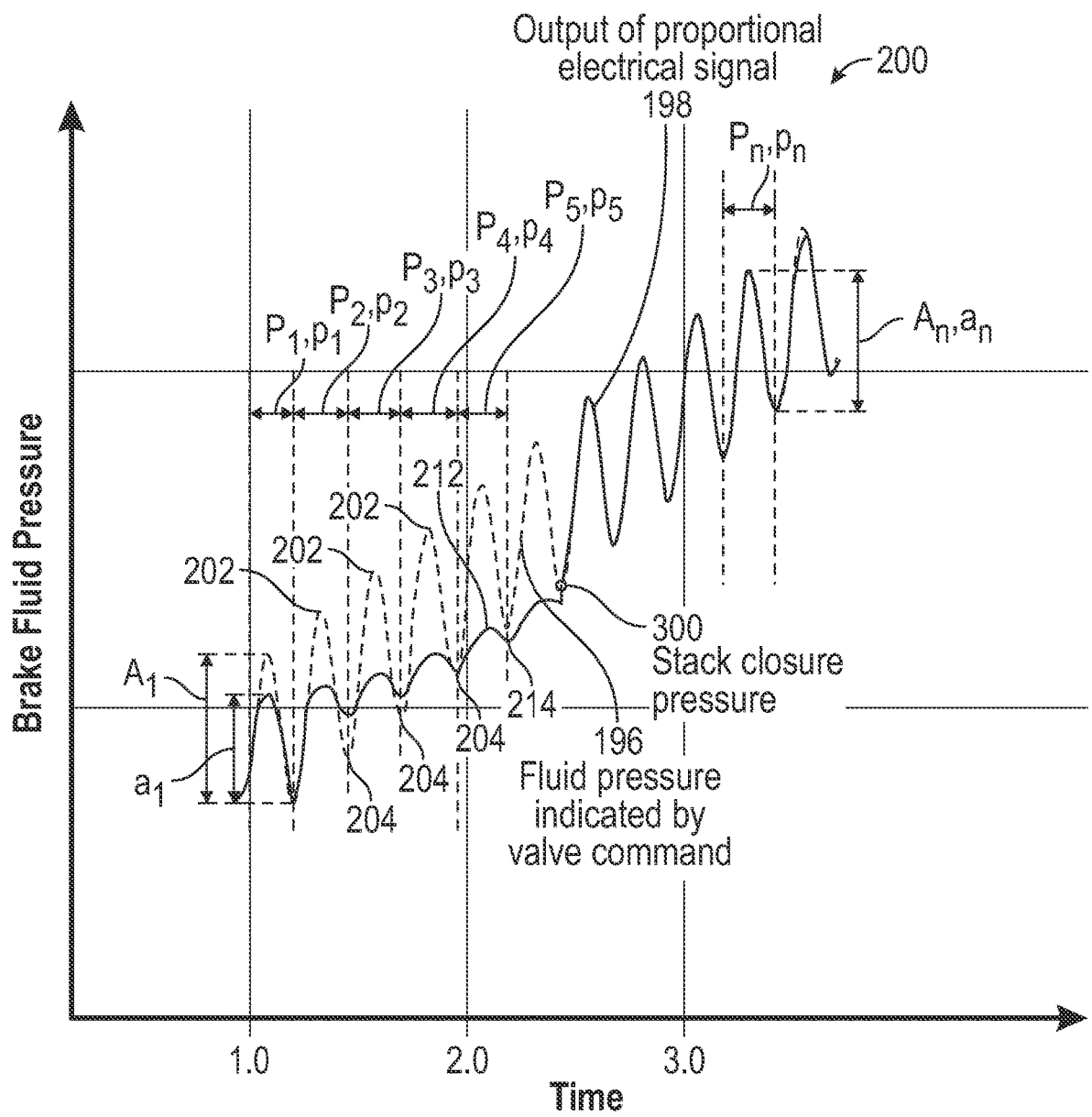
FIG. 5A is a graph illustrating an alternative procedure for determining the stack closure pressure of the brake stack shown in FIG. 1 based on amplitude attenuation according to an exemplary embodiment.
Figure 5B:
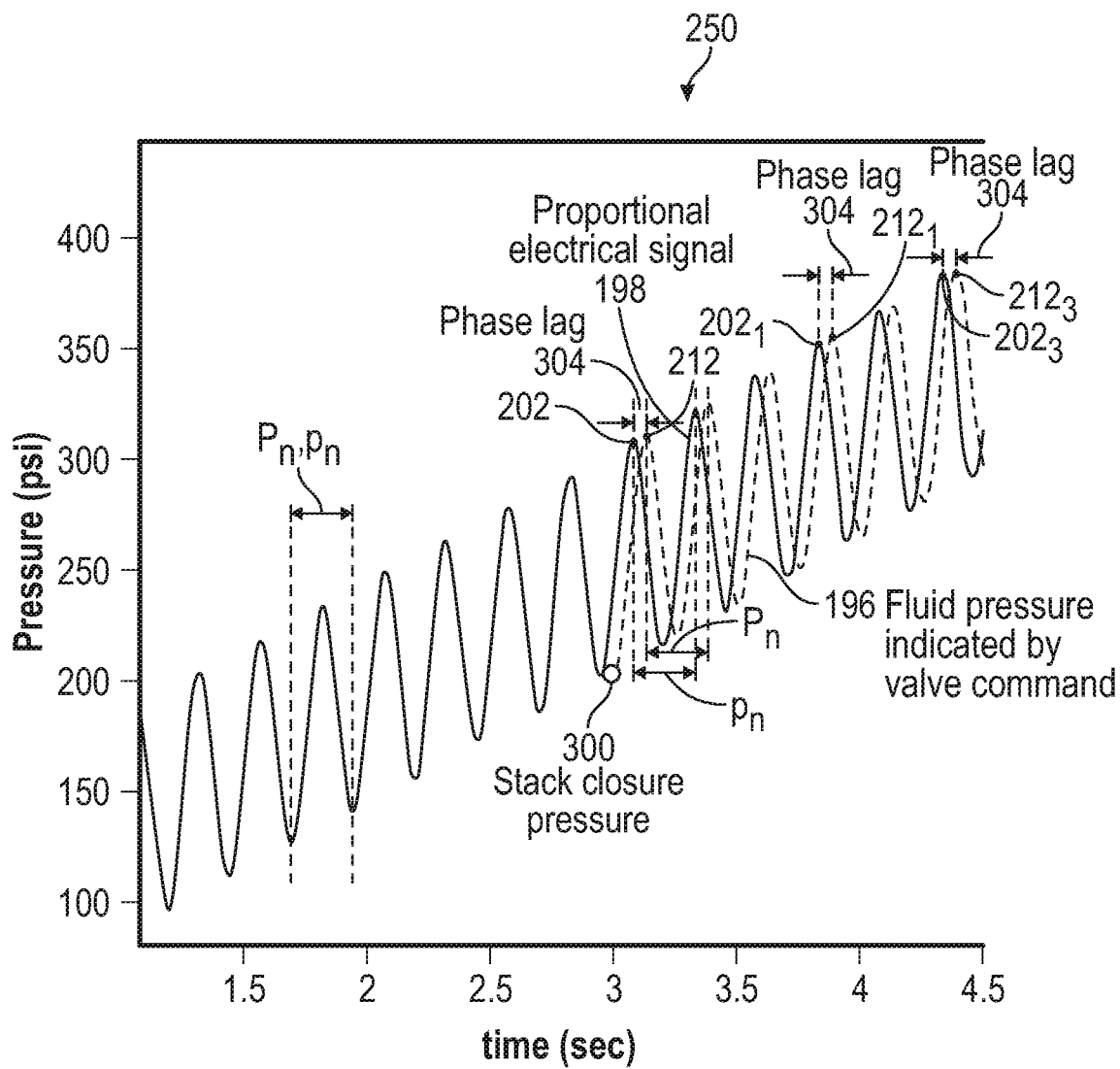
FIG. 5B is a graph illustrating another procedure for determining the stack closure pressure of the brake stack shown in FIG. 1 based on a phase lag according to an exemplary embodiment.

FIGS. 5A and 5B illustrate alternative approaches for determining the stack closure pressure. Namely, FIG. 5A illustrates a graph 200 of a response of the brake system 18 based on amplitude attenuation and FIG. 5B is a graph 250 of response of the brake system 18 based on a phase lag. It is to be appreciated that while amplitude attenuation and the phase lag are illustrated in separate figures, the brake system 18 may exhibit both responses. In other words, amplitude attenuation and phase lag are not mutually exclusive of one another. Referring now to both FIGS. 1 and 5A, a dashed reference line is the fluid pressure indicated by the valve command 196 and the solid line represents an output of the proportional electrical signal 198, which is generated by the one or more pressure transducers 28. The fluid pressure indicated by valve command 196 is in the form of a periodic signal. For example, in the embodiment as shown in FIG. 5A, the periodic signal includes a sine waveform. Although a sine waveform is illustrated, it is to be appreciated that other types of periodic signals may be used as well. In an embodiment, the periodic signal includes one of the following: a sine waveform, step waveform, an impulse waveform, a triangular waveform, and a sawtooth waveform.

The periodic signal may also be referred to as a dithering input since the value of the periodic signal switches between respective maximum and minimum values. Specifically, the fluid pressure indicated by valve command 196 includes a maximum value 202 and a minimum value 204 for each period $P_n$ of the periodic signal (where FIG. 5 illustrates multiple periods $P_1$, $P_2$, etc.). Similarly, the output of the proportional electrical signal 198 includes a maximum value 212 and a minimum value 214 for each period $p_n$ of the periodic signal as well.

The valve command 52 instructs the valve 26 to modulate the fluid pressure of the brake system 18 based on a waveform of the periodic signal, which results in modulating the amount of brake fluid supplied to the cylinder 40. For example, in the embodiment as shown, the valve 26 modulates the fluid pressure of the brake system 18 based on a sine waveform. The valve command 52 also instructs the valve 26 to increase the fluid pressure of the brake system 18 at a fixed rate while simultaneously modulating the fluid pressure as well. This results in an increase in the amount of brake fluid supplied to the cylinder 40 at the fixed rate while simultaneously modulating the amount of brake fluid. In other words, as time progresses, the maximum value 202 and the minimum value 204 of each period $P_n$ of the fluid pressure indicated by valve command 196 increases in value. For example, the maximum value 202 as well as the minimum value 204 of the third period $P_3$ is greater than the respective maximum value 202 and minimum value 204 of the second period $P_2$. Likewise, the maximum value 202 as well as the minimum value 204 of the fourth period $P_4$ is greater than the respective values for the maximum value 202 and the minimum value 204 of the third period $P_3$.

Continuing to refer to FIGS. 1 and 5A, the valve 26 initially starts to increase the amount of brake fluid to the cylinder 40, which is a result of increasing the fluid pressure in the brake system 18 in response to receiving the valve command 52. However, the output of the proportional electrical signal 198 (which is generated by the one or more pressure transducers 28) does not match the fluid pressure indicated by valve command 196 until the stack closure pressure 300 is reached. This is because the frequency response of the brake system 18 commensurately changes in response to a change in the compliance of the brake fluid within the cylinder 40.

The fluid pressure of the pressurized chamber 48 of the cylinder 40 follows the waveform the periodic signal of the valve command 52. Specifically, the phase $P_n$ of the fluid pressure indicated by valve command 196 and the phase $p_n$ of the output of the proportional electrical signal 198 are substantially synchronized with one another before the stack closure pressure 300 is achieved. However, after stack closure pressure 300 is achieved, a phase lag between the valve command 196 and the proportional electrical signal 198 is observed. It is to be appreciated that the phase lag is generally not visible in FIG. 5A due to the x-axis and y-axis scales. Instead, the phase lag is visible in FIG. 5B and is described below. Referring back to FIG. 5A, the maximum value 202 and the minimum value 204 of a specific phase $P_n$ of the fluid pressure indicated by valve command 196 does not match the maximum value 212 and the minimum value 216 of the output of the proportional electrical signal 198 of the respective phase $p_n$ until the proportional electrical signal 58 is about equal to the stack closure pressure 300.

As seen in FIG. 5A, a pressure amplitude $a_n$ of a respective phase $p_n$ of the output of the proportional electrical signal 198 is less than a valve amplitude $A_n$ of a single phase $P_n$ of the fluid pressure indicated by valve command 196 until the proportional electrical signal 58 generated by the pressure transducers 28 is about equal to the stack closure pressure 300. However, after the stack closure pressure 300 is achieved, the pressure amplitude $a_n$ of a respective phase $p_n$ of the output of the proportional electrical signal 198 is substantially the same as the then the valve amplitude $A_n$ defined by a single phase $P_n$ of the fluid pressure indicated by valve command 196. Accordingly, the control module 22 determines the valve amplitude $A_n$ of a single phase $P_n$ of the commanded pressure indicated by valve command 196 and the pressure amplitude $a_n$ of the respective phase $p_n$ of the output of the proportional electrical signal 198 generated by the one or more pressure transducers 28. The control module 22 then compares the valve amplitude $A_n$ to the pressure amplitude $a_n$. In response to determining the valve amplitude $A_n$ and the pressure amplitude $a_n$ are about equal to one another, the control module 22 determines the output of the proportional electrical signal 198 is about equal to the stack closure pressure 300.

In one non-limiting embodiment, the control module 22 determines the fluid pressure indicated by valve command 196 and the output of the proportional electrical signal 198 are about equal to one another when the difference in the first amplitude $A_n$ and the second amplitude $a_n$ are equal to or less than about twenty seven percent (27%). However, it is to be appreciated that this value is merely exemplary in nature. Indeed, the differences in amplitude between the fluid pressure indicated by valve command 196 and the output of the proportional electrical signal 198 may vary based on the precision required by a particular application.

In one embodiment, once the control module 22 determines a value indicated by the output of the proportional electrical signal 198 is about equal to the fluid pressure indicated by valve command 196, then the control module 22 saves the value of the output of the proportional electrical signal 198 in the memory 1034 (FIG. 8) of the control module 22. In one embodiment, the memory 1034 includes the threshold number plurality of previously recorded outputs of the proportional electrical signal 198. As mentioned above, in one embodiment the threshold number plurality of previously recorded outputs of the proportional electrical signal 198 is two. Thus, the stack closure pressure of the brake system 18 is an average of the output of the proportional electrical signal 198 and the two previously recorded outputs of the proportional electrical signal 198.

Figure 6:
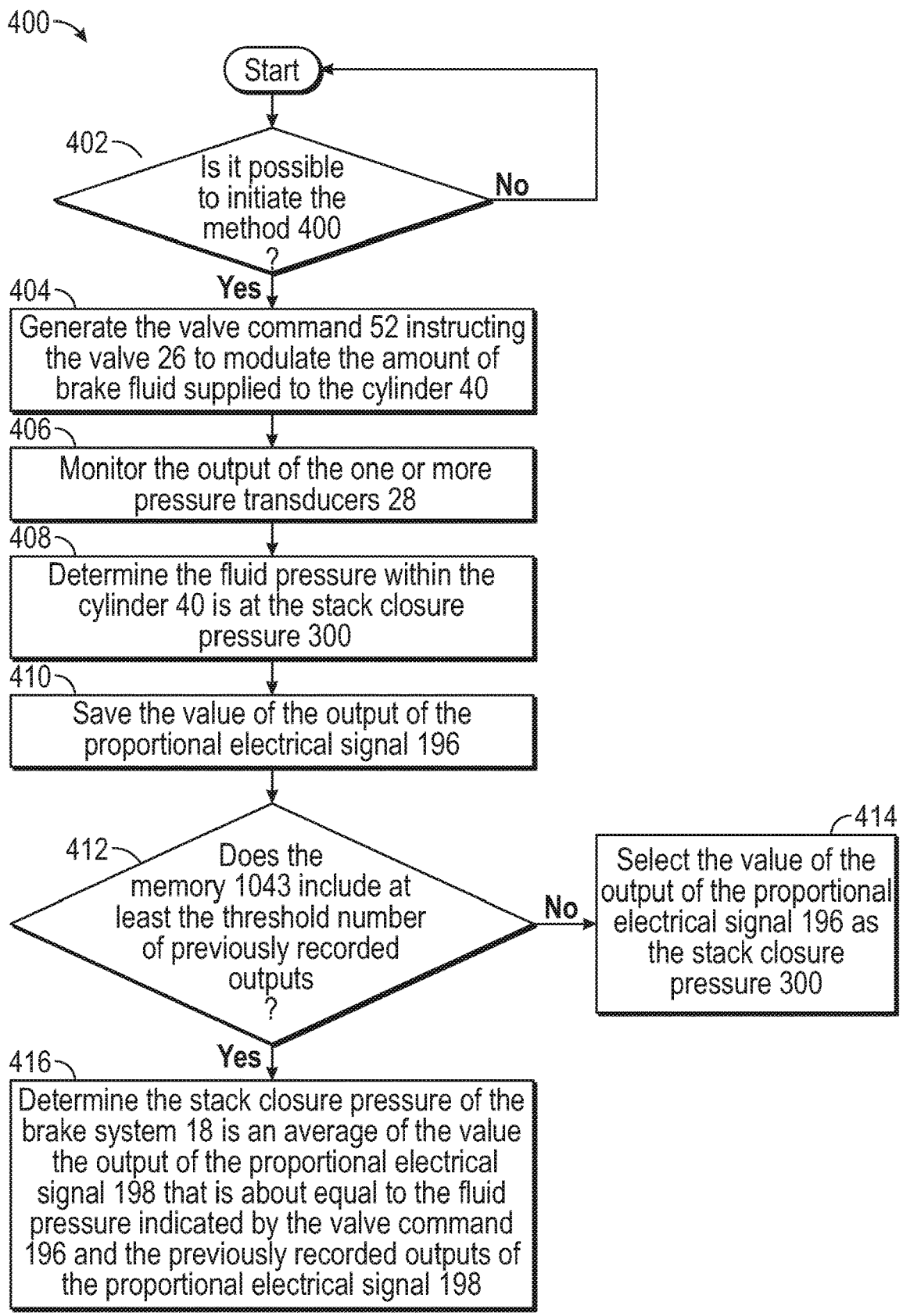
FIG. 6 is a process flow diagram illustrating an alternative method for determining the brake stack closure based on the amplitude attenuation seen in FIG. 5A according to an exemplary embodiment.

FIG. 6 is a process flow diagram illustrating an alternative method 400 for determining the stack closure pressure of the brake stack 32 based on the periodic signal shown in FIG. 5A based on amplitude attenuation. Referring to FIGS. 1, 5A, and 6, the method 400 begins at block 402. In block 402, the control module 22 initiates the method 400. For example, if the vehicle 10 is an aircraft, then the method 400 is initiated if the aircraft is in the air and the landing gear (not shown) of the aircraft is deployed. Once the method 400 is initiated, then the method 400 proceeds to block 404.

In block 404, the control module 22 generates the valve command 52 instructing the valve 56 to modulate the fluid pressure of the brake system 18 and results in modulating the amount of brake fluid supplied to the cylinder 40 based on the waveform of the periodic signal, which is seen in FIG. 5 as the fluid pressure indicated by valve command 196. The method 400 may then proceed to block 406.

In block 406, the control module 22 monitors the output of the proportional electrical signal 198 generated by the one or more pressure transducers 28. As seen in FIG. 5, the output of the proportional electrical signal 198 is not equal to the fluid pressure indicated by the valve command 196 until the stack closure pressure 300 is achieved. The method 400 may then proceed to block 408.

In block 408, the control module 22 determines the fluid pressure within the cylinder 40 is at the stack closure pressure 300 in response to the output of the proportional electrical signal 198 being about equal to the fluid pressure indicated by the valve command 196, where the stack closure pressure represents the minimum amount brake pressure required to generate brake torque by the brake stack 32. The method 400 may then proceed to block 410.

In block 410, the control module 22 saves the value the output of the proportional electrical signal 198 that is about equal to the fluid pressure indicated by the valve command 196 in the memory 1034 (FIG. 8). The method 400 may then proceed to decision block 412.

In decision block 412, the control module 22 determines if the memory 1034 includes at least the threshold number of previously recorded outputs of the proportional electrical signal 198. For example, in one embodiment threshold number of previously recorded outputs of the proportional electrical signal 198 is two. If the memory 1034 does not include the threshold number of previously recorded outputs of the proportional electrical signal 198, then the method 400 proceeds to block 414. In block 412, the control module 22 selects the value of the output of the proportional electrical signal 198 determined in block 408 as the brake stack pressure. Alternatively, the control module 22 may not select a brake stack pressure. The method 400 may then terminate.

If the memory 1034 includes the threshold number of outputs of the proportional electrical signal 198, then the method 400 may proceed to block 416. In block 416, the control module 22 determines the stack closure pressure of the brake system 18 is an average of the value the output of the proportional electrical signal 198 that is about equal to the fluid pressure indicated by the valve command 196 and the previously recorded outputs of the proportional electrical signal 198. The method 400 may then terminate.

Referring now to FIGS. 1 and 5B, the phase lag is now described. Specifically, the graph 250 in FIG. 5B illustrates the valve command 196 and the output of the proportional electrical signal 198, which is generated by the one or more pressure transducers 28. The valve 26 modulates the fluid pressure of the brake system 18 based on the periodic signal, which is a sine waveform. The valve command 52 also instructs the valve 26 to increase the fluid pressure of the brake system 18 at the fixed rate while simultaneously modulating the fluid pressure as well, which results in increasing the amount of brake fluid supplied to the cylinder 40 at the fixed rate while simultaneously modulating the amount of brake fluid.

The fluid pressure of the pressurized chamber 48 of the cylinder 40 follows the waveform the periodic signal of the valve command 52. Specifically, the phase $p_n$ of the output of the proportional electrical signal 198 and the phase $P_n$ of the fluid pressure indicated by valve command 196 are substantially synchronized with one another before the stack closure pressure 300 is achieved. However, immediately after stack closure pressure 300 is achieved, a phase lag 304 between the valve command 196 and the proportional electrical signal 198 is present. As seen in FIG. 5A, the phase $p_n$ of the output of the proportional electrical signal 198 lags the phase $P_n$ of the fluid pressure indicated by valve command 196 immediately after the proportional electrical signal 58 (FIG. 1) is about equal to the stack closure pressure 300. In other words, the phase lag 304 exists between the phase $p_n$ of the output of the proportional electrical signal 198 and the phase $P_n$ of the fluid pressure indicated by valve command 196

The phase lag 304 shown in FIG. 5B represents a difference between the maximum value 202 of the output of the proportional electrical signal 198 and the maximum value 212 of the fluid pressure indicated by valve command 196. However, it is to be appreciated that the phase lag 304 may be represented as a difference between any two analogous points measured along the proportional electrical signal 198 and the fluid pressure indicated by valve command 196. The phase lag 304 remains constant after stack closure pressure 300 is reached. In other words, the phase lag 304 measured between a first maximum value $202_1$ of the output of the proportional electrical signal 198 and a first maximum value $212_1$ of the fluid pressure indicated by valve command 196 is about the same as the phase lag 304 measured between a third maximum value $202_3$ of the output of the proportional electrical signal 198 and a third maximum value $212_3$ of the fluid pressure indicated by valve command 196. However, it is to be appreciated that the phase lag 304 is recalculated over the life of the brake system to account for changes in the brake system 18 such as, for example, brake wear and any changes in the volume of the brake fluid.

Figure 7:
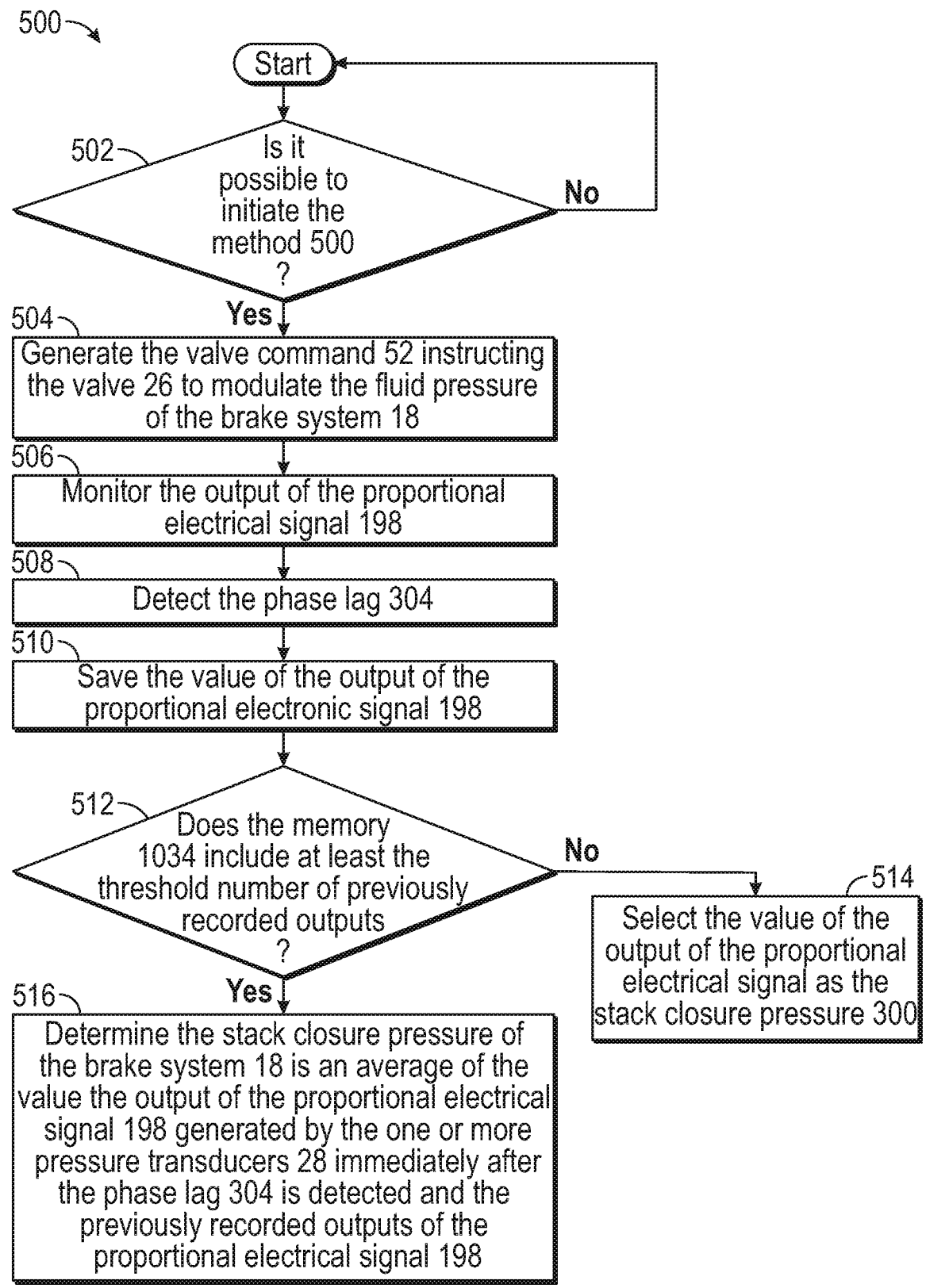
FIG. 7 is process flow diagram illustrating an alternative method for determining the brake stack closure based on the phase lag seen in FIG. 5B according to an exemplary embodiment.

FIG. 7 is a process flow diagram illustrating an alternative method 500 for determining the stack closure pressure of the brake stack 32 based on phase shifting. Referring to FIGS. 1, 5B, and 6, the method 500 begins at block 502. In block 502, the control module 22 initiates the method 400. Once the method 500 is initiated, then the method 400 proceeds to block 504.

In block 504, the control module 22 generates the valve command 52 instructing the valve 56 to modulate the fluid pressure of the brake system 18, which results in modulating the amount of brake fluid supplied to the cylinder 40 based on the waveform of the periodic signal, which is seen in FIG. 5B as the fluid pressure indicated by valve command 196. The method 500 may then proceed to block 506.

In block 506, the control module 22 monitors the output of the proportional electrical signal 198 generated by the one or more pressure transducers 28. As seen in FIG. 5B, the output of the proportional electrical signal 198 is in phase with the fluid pressure indicated by the valve command 196 until the stack closure pressure 300 is achieved. The method 500 may then proceed to block 508.

In block 508, the control module 22 detects the phase lag 304, where the phase lag 304 represents a lag in the output of the proportional electrical signal 198 generated by the one or more pressure transducers when compared to the fluid pressure indicated by the valve command 196. The method 500 may then proceed to block 510.

In block 510, in response to detecting the phase lag 304, the control module 22 saves the value the output of the proportional electrical signal 198 generated by the one or more pressure transducers 28 immediately after the phase lag 304 is detected in the memory 1034 (FIG. 8). The method 500 may then proceed to decision block 512.

In decision block 512, the control module 22 determines if the memory 1034 includes at least the threshold number of previously recorded outputs of the proportional electrical signal 198. For example, in one embodiment threshold number of previously recorded outputs of the proportional electrical signal 198 is two. If the memory 1034 does not include the threshold number of previously recorded outputs of the proportional electrical signal 198, then the method 500 proceeds to block 514. In block 512, the control module 22 selects the value of the output of the proportional electrical signal 198 determined in block 510 as the brake stack pressure. Alternatively, the control module 22 may not select a brake stack pressure. The method 500 may then terminate.

If the memory 1034 includes the threshold number of outputs of the proportional electrical signal 198, then the method 500 may proceed to block 516. In block 516, the control module 22 determines the stack closure pressure of the brake system 18 is an average of the value the output of the proportional electrical signal 198 generated by the one or more pressure transducers 28 immediately after the phase lag 304 is detected and the previously recorded outputs of the proportional electrical signal 198. The method 500 may then terminate.

Referring generally to the figures, the disclosed brake system provides a relatively simple and robust approach for determining the stack closure pressure of the brake stack. The value of the stack closure pressure may be used as an initial pressure command, which results in a reduced amount of lag that commonly occurs in conventional brake systems when the brakes are initially applied. Furthermore, it is to be appreciated that the value of the stack closure pressure is not a fixed value and may be adjusted to accommodate changes in the brake system that occur over time. Specifically, the stack closure pressure is recalculated over the life of the brake system to account for changes in the brake system such as, for example, brake wear and any changes in the volume of the brake fluid. It is to be appreciated that vehicles such as aircraft include one than one brake system, and each brake system may include its own individual stack closure pressure.

Referring now to FIG. 8, the control module 22 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein.

The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A brake system having a brake stack with a stack closure pressure, the brake system including a force member positioned within a cylinder, a valve configured to adjust fluid pressure in the brake system, and one or more pressure transducers that generate a proportional electrical signal representative of the fluid pressure within the cylinder, the brake system comprising:
    one or more processors in electronic communication with the valve and the one or more pressure transducers; and
    a memory coupled to the one or more processors, the memory storing data comprising a database and program code that, when executed by the one or more processors, causes the brake system to:
        generate a valve command instructing the valve to modulate the fluid pressure in the brake system based on a waveform of a periodic signal, which results in modulating an amount of brake fluid supplied to the cylinder;
        monitor an output of the proportional electrical signal generated by the one or more pressure transducers, wherein the output of the proportional electrical signal does not follow the waveform of the periodic signal of the fluid pressure indicated by the valve command until the stack closure pressure is achieved; and
        determine the fluid pressure within the cylinder is at the stack closure pressure when the output of the proportional electrical signal follows the waveform of the periodic signal of the fluid pressure indicated by the valve command.

2. The brake system of claim 1, wherein the one or more processors execute instructions to:
    instruct the valve to increase the amount of brake fluid supplied to the cylinder at a fixed rate while simultaneously modulating the amount of brake fluid.

3. The brake system of claim 1, wherein the one or more processors execute instructions to:
    save a value of the output of the proportional electrical signal that follows the waveform of the periodic signal of the fluid pressure indicated by the valve command the memory, wherein the memory includes a threshold number of previously recorded outputs of the proportional electrical signal.

4. The brake system of claim 3, wherein the one or more processors execute instructions to:
    determine the stack closure pressure of the brake system is an average of the value of the output of the proportional electrical signal that follows the waveform of the periodic signal of the fluid pressure indicated by the valve command and the threshold number of previously recorded outputs of the proportional electrical signal.

5. The brake system of claim 1, wherein the waveform of the periodic signal is selected from a group comprising of a sine waveform, step waveform, an impulse waveform, a triangular waveform, and a sawtooth waveform.

6. The brake system of claim 1, wherein the one or more processors execute instructions to:
 determine a valve amplitude of a single phase of the fluid pressure indicated by the valve command;
 determine a pressure amplitude of a respective phase of the output of the proportional electrical signal generated by the one or more pressure transducers;
 compare the valve amplitude to the pressure amplitude; and
 in response to determining the valve amplitude and the pressure amplitude follow the waveform of one another, determine the output of the proportional electrical signal is at the stack closure pressure.

7. The brake system of claim 1, wherein the amount of brake fluid includes one of a liquid and a gas.

8. The brake system of claim 1, wherein the brake system includes a dead band space.

9. The brake system of claim 1, wherein the proportional electrical signal is selected from a group comprising of: a current value, a capacitance value, and a voltage value.

10. A method for determining a stack closure pressure for a brake stack of a brake system, the method comprising:
 generating, by a computer, a valve command instructing a valve to modulate fluid pressure in the brake system based on a waveform of a periodic signal, which results in modulating an amount of brake fluid supplied to a cylinder;
 monitoring, by the computer, an output of a proportional electrical signal generated by one or more pressure transducers, wherein the one or more pressure transducers monitor the fluid pressure of the cylinder and the output of the proportional electrical signal does not follow the waveform of the periodic signal of the fluid pressure indicated by the valve command until the stack closure pressure is achieved; and
 determining the fluid pressure within the cylinder is at the stack closure pressure when the output of the proportional electrical signal follows the waveform of the periodic signal of the fluid pressure indicated by the valve command.

11. The method of claim 10, further comprising:
 instructing the valve to increase the amount of brake fluid supplied to the cylinder at a fixed rate while simultaneously modulating the amount of brake fluid.

12. The method of claim 10, further comprising:
 saving a value of the output of the proportional electrical signal that follows the waveform of the periodic signal of the fluid pressure indicated by the valve command in a memory of the computer, wherein the memory includes a threshold number of previously recorded outputs of the proportional electrical signal.

13. The method of claim 12, further comprising:
 determining the stack closure pressure of the brake system is an average of the value of the output of the proportional electrical signal that follows the waveform of the periodic signal of the fluid pressure indicated by the valve command and the threshold number of previously recorded outputs of the proportional electrical signal.

14. The method of claim 10, further comprising:
 selecting the waveform of the periodic signal from a group comprising of a sine waveform, step waveform, an impulse waveform, a triangular waveform, and a sawtooth waveform.

15. The method of claim 10, further comprising:
 determining a valve amplitude of a single phase of the fluid pressure indicated by the valve command.

16. The method of claim 15, further comprising:
 determining a pressure amplitude of a respective phase of the output of the proportional electrical signal generated by the one or more pressure transducers.

17. The method of claim 16, further comprising:
 comparing the valve amplitude to the pressure amplitude; and
 in response to determining the valve amplitude and the pressure amplitude follow the waveform of one another, determining the output of the proportional electrical signal is at the stack closure pressure.

18. The method of claim 10, wherein the amount of brake fluid includes one of a liquid and a gas.

19. The method of claim 10, wherein the brake system includes a dead band space.

20. The method of claim 10, further comprising:
 selecting the proportional electrical signal from a group comprising of a current value, a capacitance value, and a voltage value.

* * * * *